Aug. 20, 1929.                A. M. GRECO                 1,725,632
                           SHIELD FOR HEADLIGHTS
                           Filed July 28, 1927          3 Sheets-Sheet 1
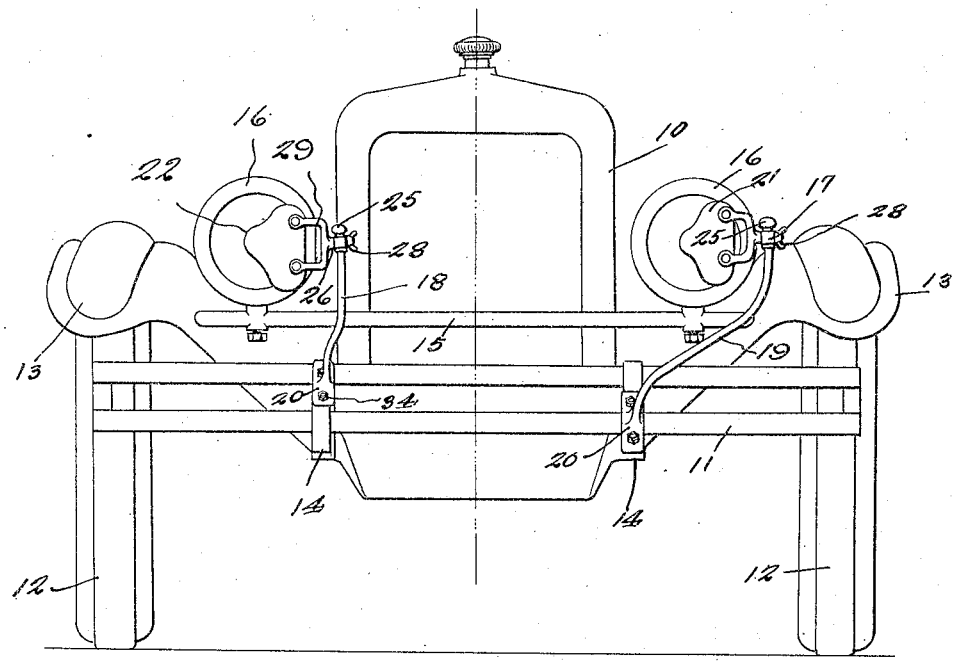
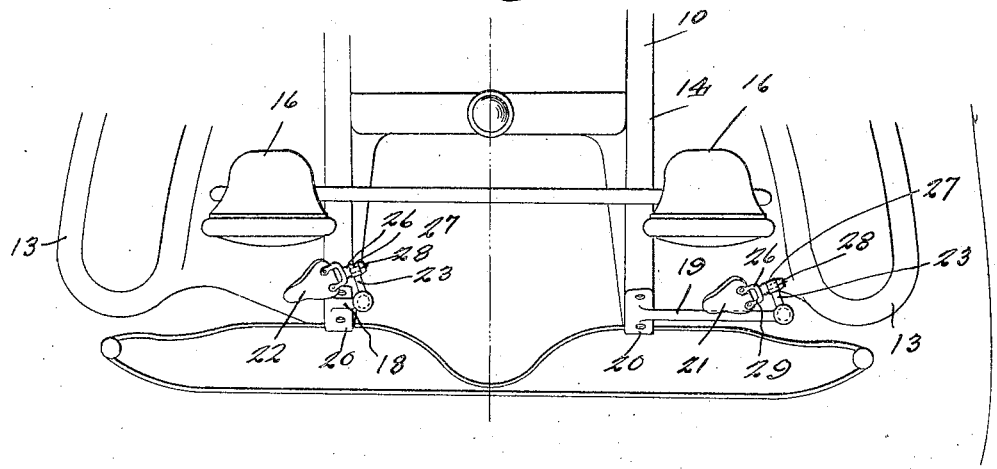
INVENTOR
Aurelio M. Greco
BY Victor J. Evans
ATTORNEY

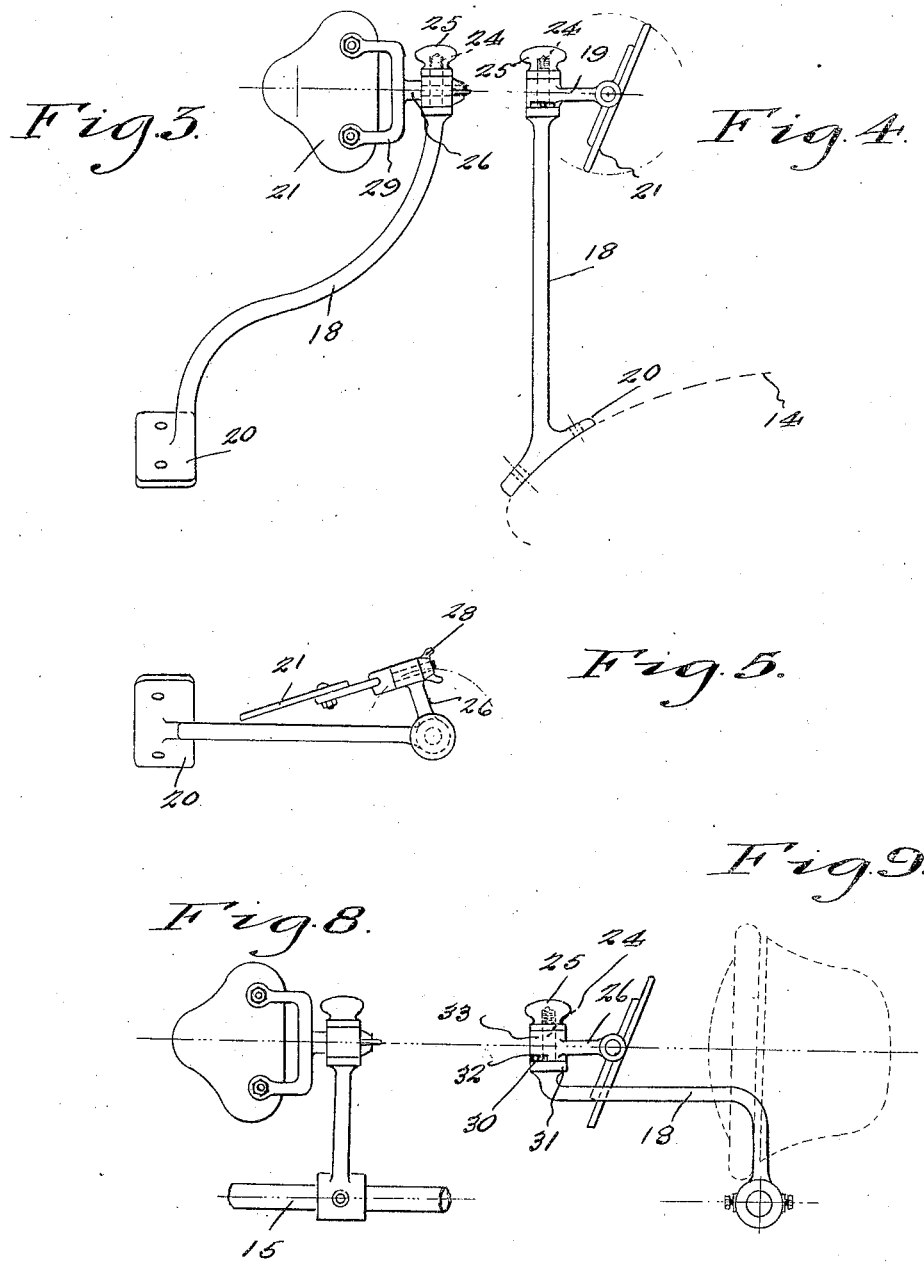

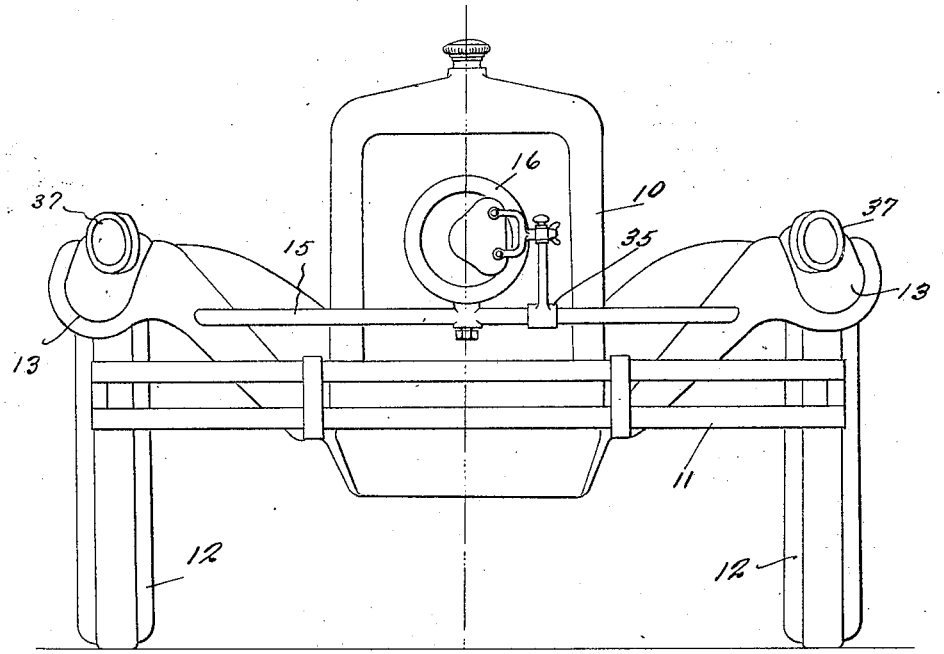
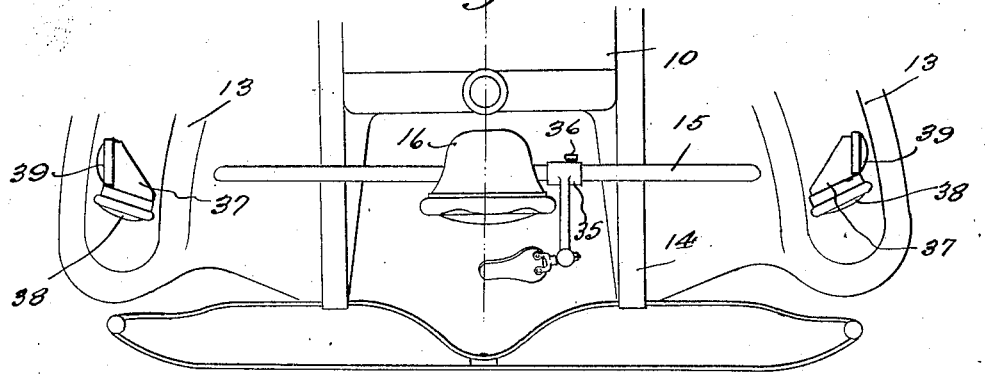

Patented Aug. 20, 1929.

1,725,632

UNITED STATES PATENT OFFICE.

AURELIO M. GRECO, OF WATERBURY, CONNECTICUT.

SHIELD FOR HEADLIGHTS.

Application filed July 28, 1927. Serial No. 209,072.

The present invention relates to shields for automobile headlights for shielding the eyes of an approaching driver or pedestrian from the blinding glare.

An important object of the invention is to provide a shield of the above character which may be mounted upon an automobile and which will protect the eyes of an approaching person passing the vehicle to which the device is attached and at the same time will not cut off the light from the roadway.

Another object is to arrange the shield for angular adjustment so as to adapt the same for various levels and for lateral angles.

Further objects are cheapness of manufacture, simplicity of construction and operation, and to render the device fool-proof as to adjustment.

Other objects and advantages will appear from the following specification and will be indicated in the appended claim, and I do not wish to be limited in the scope of my invention except as I shall be limited by said claim.

In the drawings:

Figure 1 is a front elevation of an automobile, showing two headlights thereupon and illustrating an adaptation of my invention to the aforesaid conditions Figure 2 is a plan view of the same.

Figure 3 is a detail view on an enlarged scale and in front elevation of the shield, showing the adaptation of the supporting structure thereof to the left side of an automobile.

Figure 4 shows the same in side elevation and shows the manner in which the device is secured to one of the front ends of the chassis of an automobile, the chassis being shown in dotted lines.

Figure 5 is a plan view of the same.

Figure 6 is a front elevation of an automobile, showing a single headlight at the center of the machine and showing a shield of the above character adapted to such a central light.

Figure 7 is a plan view similar to Figure 6.

Figure 8 is a detail view in front elevation, showing the shield adapted for a single headlight.

Figure 9 is a side elevation of the same.

Figure 10 is a diagrammatic view, showing the relation of an approaching person to the headlight of an automobile and to the shield located therebetween.

Referring to the drawings in detail, the same reference characters designating the same parts in all figures of the drawings, 10 designates an automobile, 11 is the bumper thereof, 12 the wheels, 13 the fenders, 14 is the chassis, and 15 is a bar secured to the front of the automobile and to which the headlights 16 may be attached.

17 designates in a general way the organization constituting the subject of my invention, which comprises bracket arms 18 and 19 which may be suitably attached to any part of the automobile, as to the chassis 14, by means of plates 20, preferably formed to conform to the curvature of the chassis, or other parts of the vehicle to which it is to be attached, and formed integrally with the bracket arms 18.

Secured to the upper end of the bracket arms are shields 21 and 22, the connection between the shields and the arms 18 being by means of rods 23 secured to the arms 18 for angular adjustment relative thereto in a horizontal plane, adjustment being about vertical pins 24 threaded to receive thereon clamping nuts 25 for holding the rods 23 in angular adjustment. The shields are also adapted for angular adjustment about a horizontal axis by means of members 26 projecting therefrom and through eyes 27 on the ends of the rods 23, the ends of the members 26 being threaded to receive thereon wing nuts 28. The members 26 are preferably provided with spaced arms 29 to which the shields 21 and 22 are attached. The shields 21 and 22 are in the shape of isosceles triangles with the arms 29 attached adjacent the base thereof and the apex of the triangular configuration and the angles adjacent the base being preferably rounded so as to present wider surfaces where the light rays are greatest, and the triangular configuration while effective in cutting off the light from the eyes of an approaching person, at the same time does not present a resisting surface to the wind such as is likely to cause the breakage of the shields and consequent damage to the lenses of the headlights. The shields are preferably made of plate glass which may be colored to suit the taste or requirements of conditions and which is preferably green or blue, but may be red or any other color as may be found desirable. Colored light of this character is not so intense as white light and while it permits an approaching person to see the headlights clearly, will prevent the glare that would be presented by unobstructed white light from reaching his eyes.

The rearward horizontal adjustment of the shields is limited by stops 30 formed on the shoulders 31 of the supports 18 and riding in the elongated notches 32 formed in the collars 33 on the end of the rods 26. The relationship of the lugs 30 and notches 32 should be such as to prevent the adjustment of the shields rearwardly toward the light at an angle of less than 45° to the plane of the lens thereof. The adjustment in the other direction may have a considerable limit, as may be found convenient or desirable. The brackets may be secured to the chassis or fenders by means of bolts and nuts, as indicated at 34 in Figure 1, or may be secured to the headlight supporting rod by means of a slidable sleeve 35 and set screws 36, as shown in Figure 6, the sleeve being formed on the end of the bracket arms. It will be noted from Figure 1 that where the shields are used in connection with two headlights, one on each side of the machine, the shields will be both located on the left side of their respective headlights and that the bracket arms 18 will each be of sufficient length and will be bent so as to bring the shields into proper relationship to the headlights. It will also be noted that the arms are either so mounted or so constructed as to space the shields a suitable distance in front of the headlight with which they are operatively associated.

In operation, when it is desired to dim the light of an automobile, the shields are placed either on the supporting rod, as shown in Figure 6, or on the chassis as shown in Figure 1, and the shields are turned about a vertical axis to the desired position. They are then adjusted about their horizontal axis to shield the upward projection of the light rays, this adjustment being ordinarily such as to cut off the light rays that would proceed to the eyes of the average person seated at the steering wheel of an approaching automobile. At the same time light will be permitted to project straight ahead and to the right side of the driver of the machine on which the shields are mounted. Light will also be allowed to pass to the left side rearwardly of the shield and downwardly on the roadway. Light will also pass through the shield, but only such rays as the particularly colored glass used is transparent to, and in this manner the location of the automobile is rendered quite apparent to the approaching driver, while at the same time his eyes are protected against the glare of the more intense white light proceeding from the headlights.

In case only a single headlight is used in the center of the automobile, as illustrated in Figure 6, I may provide side lights 37 having at the front, if desired, a colored light, or I may use a light of such intensity as will not be blinding or injurious to gaze upon. These lights may be provided with front lenses 38 and side lenses 39, the former indicating the position of the automobile in the road to the approaching driver, the side lenses throwing light out on the side of the road to aid the driver of the car on which they are mounted.

In Figure 10 is shown diagrammatically how the eyes of an approaching person are shielded from the light proceeding from a headlight, by a shield of the above described character properly adjusted for this purpose.

Having described my invention, what I claim is:

A non-glare shield for headlights consisting of a transparent colored glass of substantially triangular shape adapted to cover approximately half the left side of the lens, a bracket supporting the same, and means for adjusting the shield on a universal joint.

In testimony whereof I affix my signature.

AURELIO M. GRECO.